United States Patent [19]

Munter et al.

[11] Patent Number: 4,498,171
[45] Date of Patent: Feb. 5, 1985

[54] TONE SOURCE FOR TELEPHONE SYSTEMS

[75] Inventors: Ernst A. Munter, Kanata; Andreas L. Aczel, Nepean, both of Canada

[73] Assignee: Northern Telecom Limited, Montreal, Canada

[21] Appl. No.: 492,205

[22] Filed: May 6, 1983

[51] Int. Cl.³ ................................................ H04J 3/12
[52] U.S. Cl. ................................................. 370/110.2
[58] Field of Search ......................... 370/110.1, 110.2; 179/84 VF

[56] References Cited

U.S. PATENT DOCUMENTS

| | | | |
|---|---|---|---|
| 4,205,203 | 5/1980 | Mehta et al. | 370/110.2 |
| 4,227,248 | 10/1980 | Munter | 370/110.2 |
| 4,390,983 | 6/1983 | Duplessis et al. | 370/110.2 |
| 4,399,535 | 8/1983 | Southard | 370/110.2 |
| 4,439,639 | 3/1984 | Munter | 179/84 VF |

Primary Examiner—Douglas W. Olms
Assistant Examiner—Kenneth I. Rokoff
Attorney, Agent, or Firm—J. E. Moorhouse

[57] ABSTRACT

A tone source is automatically adaptable in operation to generate tones as required for virtually any TDM telephone system in accordance with stored tone samples being defined to meet the requirements of a particular one of the telephone systems. The tone source provides encoded tone samples from a ROM wherein each tone sequence is stored at corresponding sequential address locations. Each sequence is terminated at unique first and last address locations. The last address location is followed by an address location having an end-of-tone code stored therein. A sample of each of the tones is progressively fetched from the ROM in response to each frame occurrence in an associated operating telephone facility. The first address of each sequence is stored at a corresponding index address location in the ROM. In response to each end-of-tone occurrence the index address of the instant tone sample is read from the ROM and used as a starting point for subsequent fetches. Shortly after power-up, the tone source inherently converges into an orderly cyclic operation of providing tones as defined in the ROM.

3 Claims, 2 Drawing Figures

TONE SOURCE FOR TELEPHONE SYSTEMS

BACKGROUND OF THE INVENTION

The invention relates to an apparatus and method for generating tone signals useful in telephone systems.

In telephone systems various machine generated voice frequency signals are used for transmitting supervisory and signalling information between switching facilities and for transmitting progress signals to telephone users. In a central office switching facility (CO) multifrequency (MF) signals are typically used for inter CO trunk signalling. In a private branch switching facility (PBX) duel tone multifrequency (DTMF) signals may be used to transmit dialled digits to a central office switching facility (CO). The DTMF signal family is distinctively different in comparison with the family of MF signals in order to better avoid any operational confusion between the two. Hence it has been traditional practice for a telephone equipment manufacturer to produce at least two types of tone signal generators, one for the CO environment and a different one for the PBX environment. Additional types of tone signal generators are also typically produced for providing call progress tones, for example dial tone, busy tone etc., and for providing transmission facility test tones. If the manufacturer supplies market places involving two or more telephone operating standards, for example in North America and in Europe, the number of different types of required tone signal generators likewise increases. This is particularly so in time division multiplex (TDM) telephone systems wherein pulse code modulated (PCM) signal samples are required to be compatible with either of the A law and $\mu$law PCM standards.

SUMMARY OF THE INVENTION

In accordance with the invention a tone source is provided which is automatically adaptable in operation to generate tones as required for virtually any given TDM telephone system. The tones are derived from tone samples which are predefined in accordance with the requirements of the particular telephone system and which are stored in a storage medium for use by the tone source.

The tone source provides encoded tone samples from a storage medium, for example a read only memory (ROM) connected thereto. Each sequence is stored in the ROM at corresponding sequential address locations being terminated at unique first and last address locations. The last address location is followed by an address location having an end-of-tone code stored therein. The tone source includes a first circuit for progressively fetching a sample of each of the tones in response to each frame occurrence in an associated operating telephone facility. A first address of each sequence is stored at a corresponding index address location in the ROM. A sequence generator generates a sequence of index address in response to each frame occurrence. A second circuit is responsive to each end-of-tone code occurrence for causing a first address of a sequence to be provided to the first circuit from the index address location. Thus shortly after power-up, the tone source inherently converges into an orderly cyclic operation of providing tones being defined by the particular set of tone samples stored in the storage medium.

A method for providing a plurality of predetermined tone signals in accordance with the invention, for use in a TDM system, includes: (a) having stored sequences of samples defining each of the tone signals at consecutive address defined storage locations, having stored a first address of each sequence at a respective index address defined location in an index page, and having stored at least one end-of-tone code at each address defined permanent storage location which follows a last address of each sequence; (b) generating a sequence of the index addresses in response to each occurrence of a frame in the TDM communication system; (c) registering an information word from a temporary storage location being defined by an address corresponding to an instant one of the index addresses, and incrementing the information word to generate an instant information word; (d) reproducing the instant information word in the corresponding temporary storage location; (e) interrogating a content of an address defined permanent storage location corresponding to the instant information word, for an end-of-tone code presence or absence; (f) in response to an end-of-tone code absence coupling a digital signal representation of the interrogted content to the TDM system, and continuing with (c) in response to another one of the index addresses being generated in (b); (g) in response to an end-of-tone code presence, reproducing in the temporary storage location referred to in (c) a content of an index address permanent storage location being defined by the instant index address, and coupling a digital signal representation of an information content of one of the permanent storage locations to the TDM communication system, the permanent storage location being defined by the contents of the last referred to index address permanent storage location; (h) continuing with (c) in response to a new instant index address being generated in step (b).

BRIEF DESCRIPTION OF THE DRAWINGS

An example embodiment of a tone signals generator is discussed with reference to the accompanying drawings in which.

INTRODUCTION OF THE EXAMPLE EMBODIMENT

Figure 1:
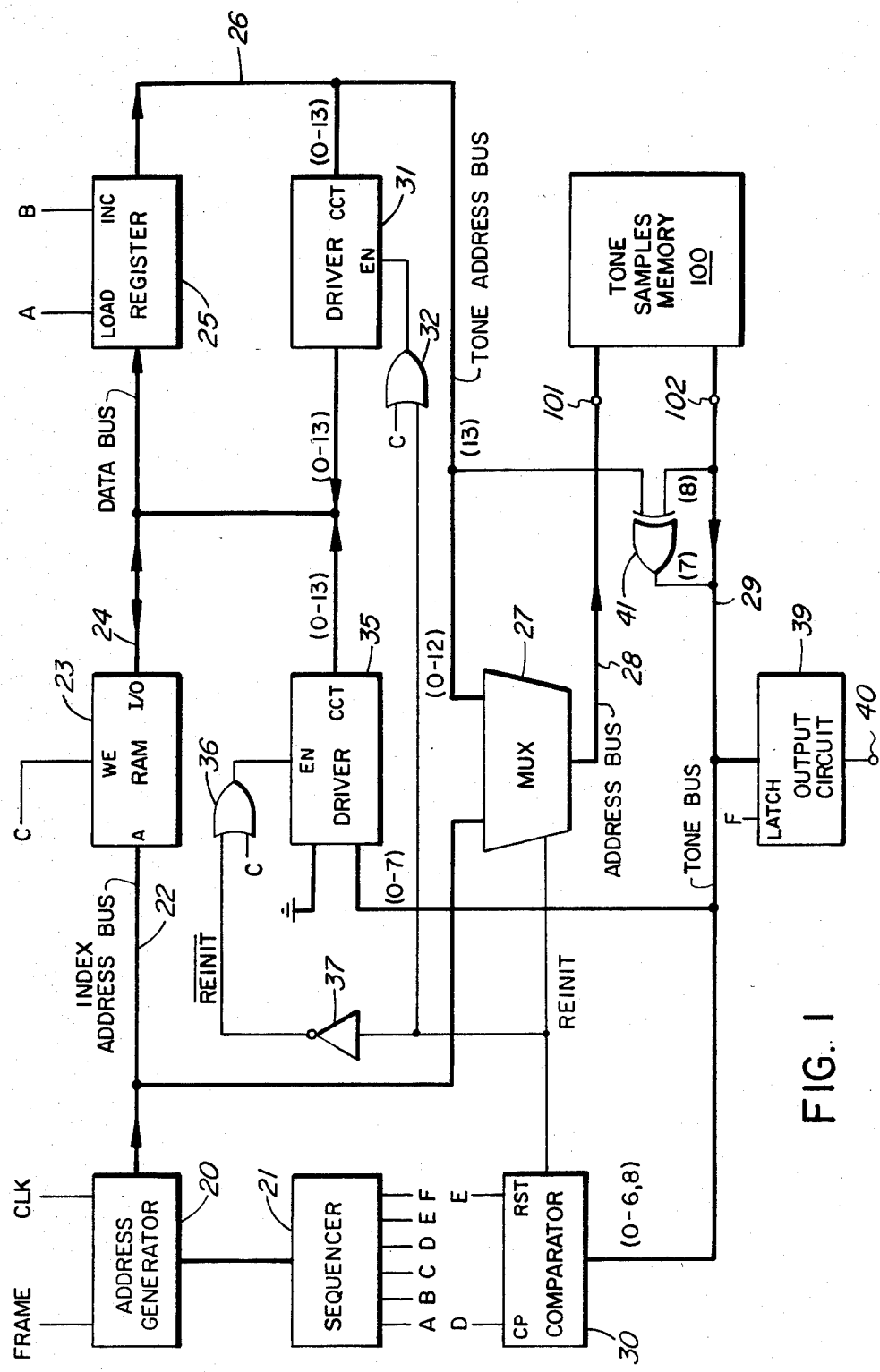
FIG. 1 is a block schematic diagram of a tone signals generator in accordance with the invention.

The tone signals generator in FIG. 1 is automatically adaptable to providing virtually any family of signalling supervisory and progress tones required for the operation of a telephone system. The tone signals generator is particularly well suited for operation with a TDM system wherein system frame and clock signals are conveniently available for operating the tone signals generator. A particular family of required tones is defined in a tone samples memory 100. The tone samples memory 100 may be any convenient storage medium, for example a ROM having predetermined tone samples stored therein at predetermined address locations. In this example the tone samples memory 100 is organized in pages of 64 words each. The first page includes an index list of first addresses corresponding to a first address of each of the tone sample sequences stored in subsequent pages. The first tone sample of each tone sample sequence is stored at a first address location of a page and the following samples are stored at following address locations extending through one or more pages as required. It is essential that an address location immediately following the last address location of a tone sample sequence has a predetermined end-of-tone stored therein. It is convenient but not essential that all of the address storage locations not otherwise used in the tone samples memory 100 also have the end-of-tone code stored therein.

The derivation of PCM signal samples exemplary of tone signal samples is not of primary importance to an understanding of the structure and operation of the example embodiment. However a review of methods of calculation and an example of ROM space useage are presented in an addendum which follows a description of the example embodiment.

DESCRIPTION OF THE EXAMPLE EMBODIMENT

Figure 2:
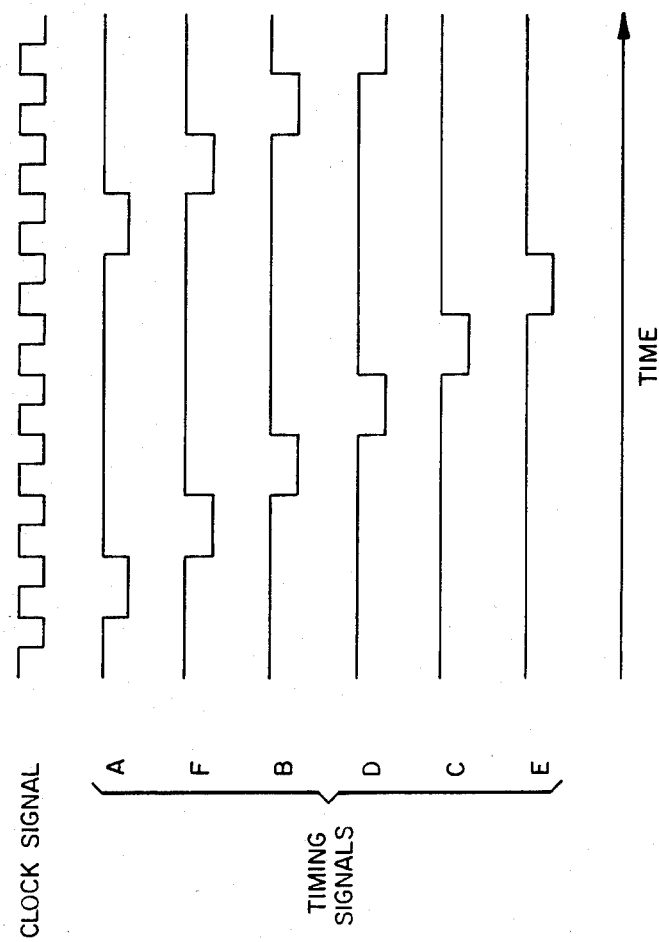
FIG. 2 is a graphical representation of various timing signals used in the operation of the tone signals generator in FIG. 1.

Referring to FIG. 1, clock, power and ground leads, not shown, are connected as required to the illustrated circuit elements in a manner well known in the digital electronic circuit art. Only those timing signals of peculiar significance in the example embodiment, as for example those illustrated in FIG. 2, are discussed in more detail. In FIG. 1, an address generator 20 is connected to be responsive to frame and clock signals from an associated telephone exchange, not shown, for generating an index address sequence on an index address bus 22, during the period of the frame signal. The address generator 20 may be provided by a typical arrangement of counting circuits (not shown) wherein a portion of the counting circuits have lesser significant outputs connected to a sequencer 21 and a portion of the counting circuits have greater significant outputs connected to an address port A of a random access memory (RAM) 23, and to an input of a digital multiplexer 27. The sequencer 21 may be provided by a typical decoding logic array being adapted for this purpose or alternately by a ROM with appropriate data stored therein for generating timing signals A through F, illustrated in FIG. 2, on correspondingly labelled leads. The RAM 23 includes an input/output data port I/O for both receiving data signals from and asserting data signals on leads 0–7 of a data bus 24. The RAM 23 is operational to read and write under the control of timing signal C being connected via the lead C to a write enable input WE of the RAM 23. A register circuit 25 is connected to register the signal states of the data bus 24 in response to timing signal A being connected via the lead A to a load control input of the register 25. The register circuit 25 is conveniently provided by a counter circuit having an increment control or count input INC connected to be responsive to the timing signal B for adding a ONE to binary data registered therein. The binary data is registered at fourteen bit locations in the register 25 and is asserted by the register 25 on corresponding leads 0–13 of a tone address bus 26. Leads 0–12 of the tone address bus 26 are connected to an input of the multiplexer 27, and to corresponding inputs of a driver circuit 31. The lead 13 is also connected to an input of an EXCLUSIVE OR gate 41. The driver circuit 31 includes outputs 0–13 connected to the corresponding leads in the data bus 24. An enable input EN of the driver circuit 31 is connected to receive a logical OR of the timing signal C and a reinitiating signal from a lead labelled REINIT, via an OR gate 32. The data bus 24 is also connected with outputs 0–13 of a driver circuit 35. The driver circuit 35 includes an enable input EN connected to receive a logical OR of the timing signal C and an inversion of the reinitiating signal via an inverter 37 and an OR gate 36. The multiplexer 27 includes an output connected to an address bus connector 101 by an address bus 28. A tone bus 29 is connected from a tone bus connector 102 to a digital comparator 30, an output circuit 39, the driver circuit 35 and the EXCLUSIVE OR gate 41. The connectors 101 and 102 provide for connection of the tone sample memory 100. More particularly the tone samples memory 100 includes outputs 0–6 for connection to corresponding leads in the tone bus 29. Another output 7 of the tone signals memory 100 is for connection to a lead 8 in the tone bus 29. The lead 8 is connected to an input of the EXCLUSIVE OR gate 41 the output of which originates at a lead 7 of the tone bus 29. Leads 0–6 and 8 of the tone bus 29 are connected to inputs of the digital comparator circuit 30. The digital comparator circuit 30 also includes compare and reset inputs CP and RST connected to receive control signals D and E for controlling operations of the digital comparator circuit 30. Leads 0–7 of the tone bus 29 are connected to inputs of the driver circuit 35 such that the signal states of these leads are transferable to leads 5–13 of the data bus 24 respectively. Remaining inputs of the driver circuit 35 are connected to ground. Leads 0–7 of the tone bus 29 are connected to an input port of an output circuit 39. The output circuit 39 which provides for transfer of tone samples from the tone bus 29 to the associated telephone exchange via a connector 40. The output circuit 39 is connected to be responsive to the timing signal F for the purpose of registering tone signal samples appearing on the leads 0–7 of the tone bus 29. The output circuit 39 may be provided by any of several circuit structures ranging from a simple serial shift register output interface, to a fully time independent double buffered addressable output. The latter arrangement may also include connection with the output of the address generator 20. The design of any particular output circuit structure will be a matter of convenient choice for a person skilled in the electronic arts having consideration of the structure of a particular telephone exchange with which the tone signals generator is required to operate. It is envisaged that the tone signals generator be in the form of an integrated circuit, both the address generator 20 and the output circuit 39 are advantageously provided for by various circuit structures being functionally configurable by pin selectable connections to be compatible for use with various well known TDM systems.

There are two modes of operation which occur in the normal use of the tone signals generator. One is normal mode of operation, which prevails generally throughout the service life of the tone signals generator. The other is a power-up or start-up mode of operation which is a fleeting occurrence during which the tone signals generator automatically converges toward the normal mode of operation for each of the tones defined by the tone samples stored in the particular tone samples memory. Many of the circuit functions in the normal mode of operation are common to the start-up mode of operation.

In the normal mode of operation, sequential addresses are generated by the address generator 20 in response to clock signals, illustrated in FIG. 2, being received from a clock lead labelled CLK. The sequential addresses are synchronized with frame signals being received from a frame lead labelled FRAME. The lesser significant bits of the addresses are used by the sequencer 21 to generate the control signals A-F illustrated in FIG. 2. The more significant bits of the addresses are used for access for both reading and writing storage locations in the RAM 23 under control of the timing signal C. Each time a storage location of the RAM 23 is read onto the data bus 24 this output is registered in the register 25 and applied to the address port of the tone samples memory via the tone address bus 26, the multiplexer 27, the address bus 28 and the connector 101. The tone samples memory 100 responds to providing a corresponding tone sample or end-of-tone code via the connector 102 and the tone bus 29 to the comparator 30, the driver circuit 35 and the output circuit 39. The output circuit 39 registers the tone sample under the control of the timing signal F for use by the associated TDM telephone system. After the RAM 23 has been read, the content of the register 25 is incremented by ONE in response to the control signal B. This incremented value is transferred to the data bus via the driver circuit 31 and written into the RAM 23 so that the next sample of the tone is obtained from the tone samples memory 100. This tone sample is interrogated by the comparator 30 in which it is compared with a predetermined end-of-tone code which is a unique binary word not used to represent any of the tone samples. In the event that the end-of-tone code is recognized the reinitializing signal is asserted by the comparator 30 on the REINIT lead. The reinitialize signal causes the instant index address to be directly applied via the multiplexer 27 to the tone samples memory 100. The tone samples memory 100 responds by providing the first address of the corresponding tone sample sequence on the tone bus 29. This first address is transferred via the driver circuit 35 via leads 5-13 of the data bus 24, to the I/O port of the RAM 23 wherein it is written at the instant accessed memory location. Thus, the next occurrence of the instant index address will cause the tone samples memory 100 to provide the tone sample from the beginning of the tone sample sequence.

Upon initial start-up of the tone signals generator, the content of the RAM 23 is undefined. However as may be inferred from the preceding description, access to end-of-tone codes for all of the tone sample sequences will eventually occur. Therefore the longest possible time period for complete convergence into normal operation is the frame period multiplied by the number of samples in the longest of the tone sample sequences stored in the tone sample memory 100.

Economy of memory utilization in the tone sample memory 100 is also realized in the case of symmetrical tone sample sequences in that only half of a symmetrical sequence is actually stored. One bit from the tone address bus 26 is used to control the gate 41 to either invert the sign bit of a tone sample from the memory 100 or to not invert the sign bit depending upon which half of the tone samples sequence is being addressed. This is accomplished by the EXCLUSIVE OR gate 41 and by the state of the most significant bit of a read out from the ROM 100 in response to an end-of-tone code occurrence. The most significant bit is used to indicate if the tone sample sequence is half length, as in the case of a symmetrical sequence, or is full length. For example if the most significant bit, i.e. the lead 8 in a ZERO, the most significant bit from the register 25, i.e. the lead 13, appears on the lead 7 of the tone bus 29. Thus it remains unchanged and the sign bit of each sample of the sequence is either consistently inverted or non inverted, with repeated sequences. However if this most significant bit on the lead 8 is a ONE, the most significant bit from the register 25, i.e. the lead 13, is inverted in the EXCLUSIVE OR gate 41. The inverted stated appears on the lead 7 of the tone bus 29 and subsequently causes bit 13 in the register 25 to be likewise changed to the opposite state. Hence in this case after each occurrence of the end-of-tone code, the bit 13 for the corresponding stored tone sequence is toggled, thereby causing the sign bit to likewise be toggled with each successive pass through the stored sequence.

ADDENDUM

The generation of PCM signals representative of predetermined tone signals requires the solution of two tasks. One task is to find the lowest number of samples N before samples repeat. This defines a cycle length. The second task is to calculate the PCM code for each sample.

The cycle length is found through deriving the greatest common divider (GCD) of the sampling rate, typically 8000 Hz, and all frequencies that make up the tone. For example, for dial-tone consisting of two frequencies 350 Hz and 440 Hz:

$$N = \frac{800}{GCD(8000,350,440)} = \frac{8000}{10} = 800.$$

It is often possible to change tone frequencies slightly and yet remain within permissible tolerances, to achieve significantly shorter cycle lengths and thereby require less memory space for storage of a tone samples sequence. For example, the dual tone multiple frequency (DTMF) digit 5 consists of frequencies of 770 Hz and 1336 Hz, and thus:

$$N = \frac{8000}{GCD(8000,770,1336)} = 4000.$$

However by shifting these frequencies slightly the GCD is increased in value such that:

$$N = \frac{8000}{GCD(8000,771.93,1333.33)} = 114.$$

The resulting frequency error is 0.25%, well within the ±1.5% standard telephone specification for such signals.

Certain symmetries may be expolited in generating samples tone signals. However, the only symmetry made use of in the example embodiment is that which allows the cycle length of a tone to be split in two halves, where the second half consists of a repeat of the first half with only the sign bit of each sample being inverted. This symmetry exists only under the following two conditions:

(a) the cycle length must be an even number of samples; and (b) the constitutent frequencies, expressed as rational fractions of 8000 Hz $$\left(f_x = \frac{M_x}{N_x} \cdot 8000\right)$$

must all have odd numerators $M_x$.

The latter condition is always fulfilled for single frequency tones, but not necessarily with multi-frequency tones.

In the example of DTMF digit 5, the frequencies are:

$$771.93 \text{ Hz} = \frac{11}{114} \cdot 8000 \text{ Hz};$$

and $$1333.33 \text{ Hz} = \frac{19}{24} \cdot 8000 \text{ Hz}.$$

This tone can thus be generated by storing only 57 PCM-samples, and inverting the sign bit every second turn, i.e. 57 samples straight from memory, followed by 57 samples with the sign bit inverted.

By making full use of these two techniques to reduce memory requirements, all common tones can be generated with a requirement of less than 32 kbit of ROM.

PCM tone samples are pre-calculated conveniently by means of a computer or a calculator in two steps. In the first step linear samples are calculated by multiplying the desired amplitude factor with a sampled sine function according to $$L_i = A_j \times \sin\left(\frac{f}{8000} \times 2\pi i + Q_o\right)$$

where:
$L_i$ = i -th linear sample
$A_j$ = amplitude
$f_j$ = frequency in Hertz
$Q_o$ = phase shift The value $A_j$ is derived from the required level of frequency $f_j$ which is given in dBmO. To simplify the second step to later conversion to PCM, an arbitrary scale of A should be chosen to give $$A_o = \sqrt{5215^2 + 2207^2} = 5662.78$$

for a 0 dBmO signal, wherein 5215 and 2207 are the samples of the 0 dBmO digital test signal which defines level relationships for law PCM, in accordance with the CCITT specification G.711.

Given a level in dBmO, the corresponding linear amplitude is:

$$A = 10 \frac{\text{Level }(dBm0) + 75.0606}{20} \quad (\mu - \text{law})$$

The corresponding formula for A-law calculations is:

$$B = 10 \frac{\text{Level }(dBm0) + 69.1061}{20} \quad (A - \text{law})$$

The linear samples for each frequency are calculated separately, added together sample by sample, and converted to PCM code either by table look-up or according to one of several well-known algorithms for this purpose.

Thus several degrees of freedom exist when preparing PCM codes for tone generators. Slightly changing tone frequencies can have a dramatic effect on cycle length. Similarly, the phase shifts ($Q_o$) of each frequency used in calculating the linear samples can be freely chosen but affect the peak amplitude of a multi-frequency signal. This is important for generating the standard receiver OFF HOOK (ROH) tone where a maximum loudness is desired, but without clipping by the standard +3 dBm absolute coding limit. Less obviously but with dramatic effect as well, the sampling phase shift influences the distortion of the signal when it is converted from a PCM signal to an analog signal.

Frequency, phase shift, and amplitude are advantageously manipulated to create an economical implementation of a digital tone which remains acceptable within telephony tolerance standards.

Some properties of commonly used PCM telephony tones are listed in the following table wherein a first thirty-two blocks of memory (2048 words) is used to store a basic PBX tone set and a second thirty-two blocks of memory (2048 words) is used to store a basic CO/toll tone set.

| Tone | Frequencies | Error | Length | Symmetry | 64-Byte Blocks |
|---|---|---|---|---|---|
| (Base Page of Index Addresses) | | | | — | 1 |
| Silence | — | | 1 | — | 1 |
| Dial Tone | 350 + 440 | 0.47% | 91 | No | 2 |
| Audible Ring | 440 + 480 | 0.35% | 382 | Yes | 3 |
| Busy Tone | 480 + 620 | 0.44% | 167 | No | 3 |
| Call Waiting | 440 | 0.08% | 109 | No | 2 |
| Warble | 516,650 | 0.21% | 31,37 | (No) | 2 |
| DTMF-1 | 697 + 1209 | 0.22% | 126 | Yes | 1 |
| DTMF-2 | 697 + 1336 | 0.20% | 126 | Yes | 1 |
| DTMF-3 | 697 + 1477 | 0.19% | 92 | No | 2 |
| DTMF-4 | 770 + 1209 | 0.37% | 73 | No | 2 |
| DTMF-5 | 770 + 1336 | 0.25% | 114 | Yes | 1 |
| DTMF-6 | 770 + 1477 | 0.25% | 114 | Yes | 1 |
| DTMF-7 | 852 + 1209 | 0.41% | 66 | No | 2 |
| DTMF-8 | 852 + 1336 | 0.41% | 66 | Yes | 1 |
| DTMF-9 | 852 + 1477 | 0.28% | 103 | No | 1 |
| DTMF-0 | 941 + 1336 | 0.20% | 102 | No | 2 |
| DTMF-* | 941 + 1209 | 0.09% | 119 | No | 2 |
| DTMF-# | 941 + 1477 | 0.13% | 119 | No | 2 |
| (Basic PBX-set) | | | | | 32 |
| DTMF-A | 697 + 1633 | 0.29% | 103 | No | 2 |
| DTMF-B | 770 + 1633 | 0.34% | 83 | No | 2 |
| DTMF-C | 852 + 1633 | 0.39% | 122 | Yes | 1 |
| DTMF-D | 941 + 1633 | 0.20% | 230 | Yes | 2 |
| Intercept | 440,620 | 0.11% | 109,116 | No,Yes | 3 |
| ROH | 1400 + 2060 + 2450 + 2600 | 0.68% | 120 | Yes | 1 |

-continued

| Tone | Frequencies | Error | Length | Symmetry | 64-Byte Blocks |
|---|---|---|---|---|---|
| Hightone | 480 | 0% | 50 | (Yes) | 1 |
| CCIS-Cont | 1780,2010 | 0.12,0.02% | 9,191 | No | 4 |
| MF-1 | 700 + 900 | 0% | 80 | Yes | 1 |
| MF-2 | 700 + 1100 | 0% | 80 | Yes | 1 |
| MF-3 | 900 + 1100 | 0% | 80 | Yes | 1 |
| MF-4 | 700 + 1300 | 0% | 80 | Yes | 1 |
| MF-5 | 900 + 1300 | 0% | 80 | Yes | 1 |
| MF-6 | 1100 + 1300 | 0% | 80 | Yes | 1 |
| MF-7 | 700 + 1500 | 0% | 80 | Yes | 1 |
| MF-8 | 900 + 1500 | 0% | 80 | Yes | 1 |
| MF-9 | 1100 + 1500 | 0% | 80 | Yes | 1 |
| MF-0 | 1300 + 1500 | 0% | 80 | Yes | 1 |
| MF-KP | 1100 + 1700 | 0% | 80 | Yes | 1 |
| MF-ST | 1500 + 1700 | 0% | 80 | Yes | 1 |
| MF-Code 11 | 700 + 1700 | 0% | 80 | Yes | 1 |
| MF-Code 12 | 900 + 1700 | 0% | 80 | Yes | 1 |
| MF-KP2 | 1300 + 1700 | 0% | 80 | Yes | 1 |
| (Basic CO/toll set) | | | | | 32 |

Basic PBX and CO/toll sets = 64 Blocks

What is claimed is:

1. A tone source for providing a plurality of encoded tones for use in a telephone system, said tones being defined in a storage medium having an index page of stored tone index addresses for identifying first storage locations of corresponding tone samples having been sequentially stored therein, comprising:
first means for generating sequences of index addresses corresponding to address locations in the index page;
a memory means including storage locations corresponding to the index addresses, a data port, and an address port, the memory means being readable to provide an information word via the data port and writable with an information word directed thereto via the data port at a storage location defined by an instant one of the index addresses being asserted at the address port;
a register means having an output for asserting a registered information word and an input connected with the data port of the memory means, the register means being controllable to register an information word being asserted at its input, and to register an increment of said informaion word;
second means for generating a reinitialization signal in response to a predetermined charcteristic of an information word having been read from the storage medium;
switch means being operative in an absence of the reinitialization signal, for directing a registered information word to the address port of the storage medium to cause an information word of the corresponding storage location to be asserted at the data port of the storage medium, and for directing the increment to the data port of the memory means to cause a corresponding information word to be written at a storage location being defined by the instant index address, and being alternately operative in response to a presence of the reinitialization signal for directing the instant index address to the address port of the storage medium to cause an informaion word of the corresponding storage location to be asserted at the data port of the storage medium, to cause a corresponding information word to be written at the memory means storage location being defined by the instant index address;
whereby tone samples are available from the storage medium for use in the telephone system.

2. A tone source as defined in claim 1 further comprising:
an index address bus being connected between an output of the first means and the address port of the memory means;
a data bus being connected between the data port of the memory means and the input of the register means;
a tone address bus being connected to the output of the register means;
and wherein the switch means comprises:
first driver circuits having inputs connected to the tone address bus and outputs connected to the data bus and being controlled to periodically assert the registered information word on the data bus;
a multiplexer circuit having a first input being connected to the tone address bus, a second input being connected to the index address bus, the multiplexer circuit being normally operative for directing the registered information word to the address port of the storage medium, and being operative in response to the reinitialization signal for directing an index address port of the storage medium; and
second driver circuits having outputs connected to the data bus and being responsive to the initialization signal for asserting an information word corresponding to an output of the data port of the storage medium on the data bus.

3. A tone signals circuit as defined in claim 2 further comprising:
a logic circuit being connected in series with a sign bit output appearance of the data port of the storage medium, and being responsive to a predetermined bit of each registered information word for generating a sample sign bit being either inverted or non-inverted in accordance with the signal state of the predetermined bit.

* * * * *

UNITED STATES PATENT OFFICE
CERTIFICATE OF CORRECTION

Patent No. 4,498,171    Dated    5 February, 1985

Inventor(s)    Ernst August MUNTER and Andreas Laszlo ACZEL

It is certified that error appears in the above-identified patent and that said Letters Patent are hereby corrected as shown below:

Column 8, line 1, after "for" and before "law" insert -- $\mu$ --.

Signed and Sealed this

Twenty-fourth Day of February, 1987

Attest:

DONALD J. QUIGG

Attesting Officer    Commissioner of Patents and Trademarks